United States Patent Office 3,385,876
Patented May 28, 1968

3,385,876
CURING CATALYST SYSTEM FOR
Si—H ADDITIONS
John M. Nielsen, Burnt Hills, N.Y., assignor to General
Electric Company, a corporation of New York
No Drawing. Filed Dec. 18, 1964, Ser. No. 420,857
4 Claims. (Cl. 260—448.2)

ABSTRACT OF THE DISCLOSURE

Organic solvent soluble platinum catalysts for SiH-olefin addition reactions are prepared by reacting chloroplatinic acid with an alkyl ortho-titanate in the presence of a solvent which is inert to the reactants under the conditions of the reaction.

This application is directed to a new curing catalyst system and to its use in the curing of organopolysiloxane compositions. More particularly, the present invention is directed to a specific curing catalyst system for the use in promoting the addition of organosilicon compounds having Si—H linkages across olefinic double bonds of other compositions.

In the early era of silicone chemistry, organosilanes and organosiloxanes were generally made by substitution reactions, free radical reactions, or condensation reactions. While these various mechanisms provided a convenient route to many types of organosilicon products, a number of disadvantages were recognized. Because of disadvantages of these early types of reactions, the addition reaction was adopted for use in the organosilicon field. A typical type of addition reaction would include, for example, the addition of trichlorosilane to pentene - 1, to produce amyltrichlorosilane, which is valuable as a component in compositions for rendering various surfaces water repellent.

The addition reaction had much recognized utility and considerable effort was devoted to the development of new catalysts and catalyst systems for the addition reactions which, for brevity, will sometimes hereinafter be referred to as "SiH-olefin addition reactions." Among the catalysts used in this SiH-olefin addition reaction have been elemental platinum as shown, for example, in Patent 2,970,-150—Bailey, and chloroplatinic acid as shown, for example, in Patent 2,823,218—Speier et al. While elemental platinum and platinum compounds, such as chloroplatinic acid, have found considerable utility in promoting SiH-olefin addition reactions, these reactions have still been bothered by difficulty in effecting good contact between the catalyst and the components of the reaction mixture. Elemental platinum is, of course, completely insoluble in conventional SiH-olefin addition reaction mixtures and chloroplatinic acid is insoluble in most materials employed in reaction mixtures and also in most organic solvents. These solvents, such as toluene, perchloroethylene, or hexane could conceivably be used to advantage in assisting the complete dispersion of the catalyst system into the reaction mixture.

The present invention is based on my discovery of an active, organic solvent soluble form of platinum, which form is useful in the catalysis of SiH-olefin addition reactions. Briefly, the catalyst compositions of the present invention are organic solvent solutions of the product obtained by mixing (1) chloroplatinic acid, $$H_2PtCl_6 \cdot 6H_2O$$

and (2) an alkyl orthotitanate having the formula:

(1)     $(R'O)_4Ti$ where R' is an alkyl radical having at least 4 carbon atoms. The present invention also relates to the preparation of such catalyst compositions and the use of such catalyst compositions for the production of organosilicon compositions containing silicon-carbon bonds by contacting a silicon compound containing at least one hydrogen atom attached to silicon per molecule, there being not more than two hydrogen atoms attached to any one silicon atom, with a compound containing aliphatic carbon atoms linked by multiple bonds.

The compositions and process of the present invention are based on the completely unexpected discovery that the mere mixing of chloroplatinic acid with an orthotitanate of the class described above in the presence of a suitable organic solvent results in the rapid formation of a solution of a reaction product of the chloroplatinic acid and the orthotitanate. When an attempt is made to dissolve chloroplatinic acid in these same organic solvents, no solution occurs. Also, no solution is achieved on mixing $(R'O)_4Ti$ with chloroplatinic acid in the absence of solvent. The present invention results in a catalyst system different from catalyst systems known in the art and which is readily prepared and useful in catalyzing SiH-olefin addition reactions.

The alkyl orthotitanates within the scope of Formula (1) are also well known in the art. The preferred alkyl orthotitanates within the scope of Formula (1) are those in which each of the alkyl groups is the same and contain from 4 to 8 carbon atoms. The preferred specific alkyl orthotitanate is tetrabutyl titanate. In general, the alkyl orthotitanates most desirable for use in the practice of the present invention are liquid materials.

As previously mentioned, the solvent solutions of the present invention are prepared by simply mixing chloroplatinic acid with the alkyl orthotitanate in the presence of a suitable solvent. While the ratio of chloroplatinic acid to the alkyl orthotitanate can vary within wide ranges, and although the exact mechanism of the present invention is not known, experience has indicated that the alkyl orthotitanate reacts best in the ratio of at least 5, e.g., from 5 to 25 moles of the alkyl orthotitanate per mole of chloroplatinic acid.

A wide variety of organic solvents can be used in the catalyst solution of the present invention. These solvents include hydrocarbon solvents, halogenated hydrocarbon solvents and oxygenated hydrocarbon solvents of various types. Illustrative of the solvents which can be employed in the practice of the present invention are, for example, benzene, toluene, xylene, aromatic mineral spirits, perchloroethylene, carbon tetrachloride, trichloroethylene, hexane, aliphatic mineral spirits, and the like. In addition, oxygenated materials, such as diphenyl ether, dioxane, n-amyl ether, and the like, can also be employed. The only limitation with respect to the solvent is that it be substantially inert to the reactants under the conditions of the reaction, which will be described hereinafter.

In order to cause the reaction between the chloroplatinic acid and the alkyl orthotitanate, these two components are merely mixed together in the presence of the desired solvent. As previously mentioned, at least five moles of the alkyl orthotitanate are employed per mole of chloroplatinic acid. The amount of solvent employed can vary within wide limits, depending in general upon the concentration of platinum desired in the catalyst system. In general, the amount of solvent employed is such that the concentration of platinum in the organic solvent solution is no greater than about 60,000 parts per million. A most convenient upper limit is about 30,000 parts per million of platinum in the catalyst solution. The minimum concentration of platinum desired in the catalyst solution is about 1,000 parts per million. The catalyst solution of any desired concentration can, of course, be obtained by first forming a concentrated catalyst solution, such as one containing about 30,000 parts per million of platinum, and diluting the concentrated solution to the ultimate desired concentration. In this connection, the solvent employed to prepare the concentrated catalyst solution need not be the same as the solvent which is used to dilute the catalyst solution to the desired platinum concentration.

In any event, regardless of the proportions of ingredients employed in preparing the catalyst solutions of the present invention, the three components of the catalyst solution are merely mixed together with agitation and complete solution takes place in a matter of a minute or two, or at most a matter of a few minutes, such as 5 to 10 minutes. At the end of this time, when complete solution has been obtained, the catalyst solution is ready for dilution to the desired application level if it is not already at such level, and subsequent addition to an SiH-olefin addition reaction to catalyze the reaction.

In effecting reaction between an SiH-containing compound and a compound containing aliphatic unsaturation, the catalyst composition of the present invention is used in an amount sufficient to provide about from 1 to 2000 moles of platinum per 1,000,000 moles of aliphatically unsaturated groups in the aliphatically unsaturated organic compounds. After mixing the reactants and the catalyst solution, the composition is merely maintained at the reaction temperature for a time sufficient to effect the addition reaction.

The catalyst solution of the present invention is operative for the addition of an unlimited class of silicon compounds containing a silicon-hydrogen linkage to an unlimited class of organic compounds containing a pair of aliphatic carbon atoms linked by multiple bonds.

As an illustration of the addition reactions in which the catalyst solution of the present invention are operative, reference is again made to Patent 2,823,218—Speier et al. The catalyst solution of the present invention is operative for every one of the addition reactions described in the aforementioned reaction. As a further illustration of reactions in which the catalyst solution of the present invention is applicable, reference is again made to Patent 2,970,150—Bailey. The catalyst solution of the present invention is also applicable to every one of the reactions illustrated in this Bailey patent.

The organosilicon reactant containing the silicon-hydrogen linkage can be inorganic or organic and can be monomeric or polymeric. The only requirement of the silicon-hydrogen-containing reactant is that the reactant contain at least one silicon-bonded hydrogen atom per molecule, with no more than two hydrogen atoms attached to any one silicon atom.

Among the inorganic monomeric materials which contain silicon-bonded hydrogen atoms and which are useful as reactants in the process of the present invention can be mentioned, for example, trichlorosilane and dibromosilane. Among the operable polymeric inorganic materials can be mentioned pentachlorodisilane, pentachlorodisiloxane, heptachlorotrisilane, etc.

Among the monomeric silicon compounds and organosilicon compounds containing silicon-hydrogen linkages which are operable in the practice of the present invention are those having the formula:

(2) 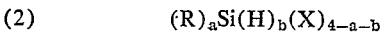

where X is a member selected from the class consisting of halogen, —OR radicals, and —OOCR radicals, R can be any organic radical, but preferably is a member selected from the class consisting of monovalent hydrocarbon radicals, halogenated monovalent hydrocarbon radicals and cyano-alkyl radicals, $a$ has a value of from 0 to 3, inclusive, $b$ has a value of from 1 to 2, inclusive, and the sum of $a$ plus $b$ is from 1 to 4, inclusive. Where more than one R radical is present in a compound within the scope of Formula (2), the various R radicals can differ from each other. Among the radicals represented by R can be mentioned, for example, alkyl radicals, e.g., methyl, ethyl, propyl, octyl, octadecyl, etc. radicals; cycloalkyl radicals such as, for example, cyclohexyl, cycloheptyl, etc., radicals; aryl radicals, e.g., phenyl, naphthyl, tolyl, xylyl, etc. radicals; aralkyl radicals, e.g., benzyl, phenylethyl, etc. radicals; and haloaryl and haloalkyl radicals, e.g., chloromethyl, chlorophenyl, dibromophenyl, etc. radicals. In the preferred embodiment of my invention, the R radical is methyl or a mixture of methyl and phenyl. In addition to the radicals mentioned above, the R radical can also be an unsaturated aliphatic radical such as vinyl, allyl, cyclohexenyl, etc. When the R radical is a radical with aliphatic unsaturation, it is possible to react the silicon compound containing silicon-hydrogen linkages with itself.

Among the specific type of monomeric silicon compounds and organic silicon compounds within the scope of Formula (2) are those having the formula:

$RSiHCl_2$, $R_2SiHCl$, $R_3SiH$, $RSiH_2Cl$, $R_2SiH_2$ $HSi(OR)_3$, $H_2Si(OR)_2$, $RSiH(OR)_2$, $HSi(OOCR)_3$ $RSiH(OOCR)_2$ and $SiHCl_3$ where R is as previously defined.

Among the silicon-hydrogen containing compounds useful in the practice of the present invention are those in which each molecule contains more than one silicon atom. Within this category are included organopolysilanes, organopolysiloxanes and various polysilalkalene compounds containing, for example, a —$SiCH_2Si$— grouping or a —$SiCH_2CH_2Si$— grouping and polysilphenylene materials which contain the —$SiC_6H_4Si$— grouping and the organosilazanes which are characterized by an Si—N—Si linkage in the polymer structure. Among the structurally uncomplicated silicon-hydrogen compounds containing more than one silicon atom are materials having the formulae:

$R_2HSiSiR_3$, $R_2HSiSiH_2R$, $R_3SiOSiHR_2$ $ClR_2SiOSiHCl_2$, $R_3SiCH_2CH_3SiHR_2$, $HR_2SiC_6H_4SiR_2H$ and $R_3SiO(RHSiO)_cSiR_3$, where R is as previously defined and $c$ is an integer, for example, an integer equal to from 1 to 10,000 or more.

Among the organopolysiloxanes operable in the practice of the present invention are polymers and copolymers containing up to one or more of the units having the formula: $R_3SiO_{0.5}$, $R_2SiO$, $RSiO_{1.5}$ or $SiO_2$ along with at least one unit per molecule having the formula: $RHSiO$, $R_2HSiO_{0.5}$, $HSiO_{1.5}$, $H_2SiO$ or $RH_2SiO_{0.5}$, where R is as previously defined.

While any of the silicon-hydrogen compounds described above are operative in the practice of the present invention, it is preferred that the silicon-hydrogen compound be an organopolysiloxane such as an organocyclopolysiloxane having the formula:

(3) $(RHSiO)_d$ or an organopolysiloxane polymer or copolymer having the formula:

(4) $(R)_eSi(H)_fO_{4-e-f}$ where R is as previously defined, $d$ is as previously defined, $e$ has a value of from 0.5 to 2.49, $f$ has a value of from 0.001 to 1.0 and the sum of $e$ plus $f$ is equal to from 1.0 to 2.5. Organopolysiloxanes within the scope of Formulae (3) and (4) are well known in the art and are prepared, for example, by the hydrolysis and condensation of various organochlorosilanes. Thus, where R is methyl, cyclopolysiloxanes within the scope of Formula (3) can be prepared by hydrolyzing and condensing methyldichlorosilane. Products within the scope of Formula (4) can be prepared by cohydrolyzing and cocondensing a mixture of two or more chlorosilanes, at least one of which contains a silicon-bonded hydrogen atom. For example, compounds within the scope of Formula (4) can be prepared by the cohydrolysis and cocondensation of one or more members selected from the class consisting of trimethylchlorosilane, dimethylchlorosilane, methyltrichlorosilane or silicon tetrachloride with one or more members selected from the class consisting of methyldichlorosilane, dimethylchlorosilane, trichlorosilane, dichlorosilane, or methylchlorosilane.

The unsaturated compounds containing olefinic or acetylenic unsaturation which can react with the compounds described above containing the silicon-hydrogen linkage include substantially all of the aliphatically unsaturated compounds known to the art. Thus, the aliphatically unsaturated compound may be a monomeric or polymeric material. The unsaturated compound can contain carbon and hydrogen only, or may also contain any other element. Where the aliphatically unsaturated compound contains an element other than carbon and hydrogen, it is preferred that the other element be oxygen, a halogen, nitrogen or silicon or mixtures of these other elements. The aliphatically unsaturated compound can contain a single pair of carbon atoms linked by multiple bonds or can contain a plurality of pairs of carbon atoms linked by multiple bonds. Among the many unsaturated hydrocarbons applicable to the present invention can be mentioned for purposes of illustration, ethylene, propylene, butylene, octylene, styrene, butadiene, pentadiene, pentene-2, divinylbenzene, vinylacetylene, etc. Preferably, the hydrocarbon is one having no more than 20 to 30 carbon atoms in the chain.

Included among the oxygen-containing unsaturated compounds which can be employed in the practice of the present invention are methylvinyl ether, divinyl ether, phenylvinyl ether, the monoallyl ether of ethylene glycol, allyl aldehyde, methylvinyl ketone, phenylvinyl ketone, acrylic acid, methacrylic acid, methylacrylate, phenylmethacrylate, vinylacetic acid, vinyloctoate, vinylacetate, oleic acid, linoleic acid, etc. Unsaturated compounds applicable in the process of the present invention also include acyclic and heterocyclic materials containing aliphatic unsaturation in the ring. Included within this class of compounds are, for example, cyclohexene, cycloheptene, cyclopentadiene, dihydrofuran, dihydropyrene, etc.

The sulfur analogs of any of the unsaturated oxygen-containing materials can also be employed in the practice of the present invention. In addition to compounds containing carbon, hydrogen and oxygen, compounds containing other elements can also be employed. Thus, halogenated derivatives of any of the materials described above can be employed including the acyl chlorides as well as compounds containing a halogen substituent on a carbon atom other than a carbonyl carbon atom. Thus, applicable halogen-containing materials include, for example, vinylchloride, the vinylchlorophenyl ethers, the allyl ester of trichloroacetic acid, etc.

Other types of unsaturated materials useful in the practice of the present invention include unsaturated materials containing nitrogen substituents such as acrylonitrile, allyl cyanide, nitroethylene, etc.

One of the particularly useful types of unsaturated compounds which can be employed in the practice of the present invention are those compounds containing silicon, such as the materials commonly referred to as organo-silicon monomers or polymers. The scope of the organosilicon compounds which are applicable to the process of the present invention is identical to the scope of the silicon-hydrogen compounds useful in the practice of the present invention. The unsaturated organosilicon componds are identical to the silicon-hydrogen compounds except that the silicon-bonded hydrogen atom is substituted with a silicon-bonded organic radical containing at least one pair of aliphatic carbon atoms linked with multiple bonds. Preferably, these organosilicon compounds are free of silicon-bonded hydrogen atoms, but it is also possible to employ organosilicon compounds containing both silicon-bonded hydrogens and silicon-bonded radicals containing silicon-bonded aliphatically unsaturated radicals.

The only requirement of these unsaturated organosilicon componds is that there be at least one aliphatically unsaturated organic radical attached to silicon per molecule. Thus the aliphatically unsaturated organosilicon componds include silanes, polysilanes, siloxanes, silazanes, as well as monomeric or polymeric materials containing silicon atoms joined together by methylene or polymethylene groups or by phenylene groups.

Of the broad class of aliphatically unsaturated organosilicon compounds which can be employed in the practice of the present invention, there are three groups of such compounds which are preferred. One of these groups is the monomeric silanes having the formula:

(5) $\quad (Y)_m(Y')_n Si(X)_{4-m-n}$ 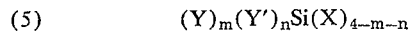

where X is as previously defined, Y is a monovalent hydrocarbon radical of the scope previously defined for R, Y' is an organic radical containing at least one pair of aliphatic carbon atoms attached by multiple bonds, $m$ is equal to from 0 to 3, inclusive, $n$ is equal to from 1 to 4, inclusive, and the sum of $m$ plus $n$ is equal to from 1 to 4, inclusive.

A second class of preferred unsaturated organosilicon compounds are those cyclopolysiloxanes having the formula:

(6) $\quad (YY'SiO)_d$ 

where Y and Y' and $d$ are as previously defined. The third group of unsaturated organic silicon compounds preferred in the practice of the present invention are those having the formula:

(7) $\quad (Y)_e(Y')_f SiO_{\frac{4-e-f}{2}}$ 

where Y, Y', $e$ and $f$ are as previously defined.

All of the organic silicon compounds within the scope of Formulae 5, 6, and 7 are well known in the art and are prepared by conventional methods. Included among the organic silicon compounds within the scope of Formulae 5, 6 and 7 are the preferred types of material in which Y is methyl or a mixture of methyl and phenyl and in which Y' is an alkenyl radical, preferably vinyl or allyl.

Within the scope of Formula 5 are silanes such as methylvinyldichlorosilane, vinyltrichlorosilane, allyltrichlorosilane, methylphenylvinylchlorosilane, phenylvinyldichlorosilane, diallyldichlorosilane, vinyl-beta-cyanoethyldichlorosilane, etc. Included among the cyclic products within the scope of Formula 6 are, for example, the cyclic trimer of methylvinylsiloxane, the cyclic pentamer of methylvinylsiloxane, the cyclic tetramer of methylvinylsiloxane, the cyclic tetramer of vinylphenylsiloxane, etc.

Included within the scope of Formula 7 are the broad class of well known organopolysiloxanes which can be resinous materials, low viscosity fluids, or high molecular weight gummy materials. These polymeric materials are prepared by the well known method of hydrolysis and condensation of a particular diorganodichlorosilane or by the cohydrolysis and co-condensation of a mixture of several different diorganodichlorosilanes. Thus products within the scope of Formula 7 can be prepared by the hydrolysis and condensation of vinyltrichlorosilane alone, divinyldichlorosilane alone, methylvinyldichlorosilane alone, phenylvinyldichlorosilane alone, or by the cohydrolysis and co-condensation of any of the aforementioned vinyl-containing chlorosilanes with one or more monoorganotrichlorosilanes, diorganodichlorosilanes, triorganochlorosilanes, or silicon tetrachloride. While the hydrolysis and cohydrolysis above have been described in connection with vinyl-containing organosilicon compounds, it should be understood that in place of the vinyl group can be any silicon-bonded organic radical containing at least one pair of aliphatic carbon atoms linked by multiple bonds.

To effect reaction between the silicon-hydrogen-containing reactant and the reactant containing aliphatic unsaturation, the two reactants are merely mixed in the desired proportions and the desired amount of catalyst solution is added and mixed in, and the reaction mixture is maintained at the desired reaction temperature for a time sufficient to effect the addition of the silicon-hydrogen bond across the multiple bonds of the aliphatically unsaturated compound. The relative amounts of the silicon-hydrogen-containing compound and the compound contaiing multiple bonds can vary within extremely wide limits. In theory, one silicon-hydrogen bond is equivalent to one olefinic double bond or one-half acetylenic triple bond so that this equivalency etstablishes the general order of magnitude of the two reactants employed. However, for many purposes it can be desirable to employ an excess of one of the reactants to facilitate the completion of the reaction or to insure that the reaction product still contains either silicon-hydrogen bonds in the unreacted state, or still contains one or more pairs of carbon atoms linked by multiple bonds. In general, however, the ratios of the reactants are selected so that there are present from about 0.005 to 20 silicon-hydrogen linkages available in one reactant per pair of aliphatic carbon atoms linked by double bonds in the other reactant or from about 0.06 to 15 silicon-hydrogen linkages in one reactant per pair of aliphatic carbon atoms linked by triple bonds in the other reactant.

As discussed above, to effect addition reactions with the catalyst solution of the present invention, the two reactants and the catalyst solution are thoroughly mixed and maintained at the reaction temperature for a time sufficient to effect the reaction. Because of the high activity of the catalyst solution, some degree of reaction often occurs at room temperature as soon as the catalyst is mixed with the reactants. Accordingly, the reaction temperature can be room temperature or even a temperature as low as about 0° C. On the other hand, there is no upper limit to the temperature at which the reaction can be run except temperature limitations imposed by the particular reactants and the particular solvent used in the catalyst solution. Thus, reaction temperatures on the order of 150 to 200° C. can be employed. Preferably, however, the reaction is effected at temperatures in the range or from about 60 to 130° C. The time required for effecting the addition reaction depends upon a number of factors, such as the particular reactants employed and the amount of catalyst solution employed. Thus, reaction times can run from a few minutes up 12 or more hours, depending on reaction conditions.

The following examples are illustrative of the practice of my invention and are not intended for purposes of limitation. All parts are by weight.

Example 1

To a reaction vessel was added 0.234 grams chloroplatinic acid, 23.46 grams perchloroethylene and 1.04 grams of tetrabutyl titanate. This reaction mixture was agitated for about 20 seconds, during which time a homogeneous solution was formed. This solution contained 3850 parts per million of platinum and 15 moles of tetrabutyl titanate per mole of chloroplatinic acid.

Example 2

To a reaction vessel was added an organopolysiloxane fluid (15 parts) containing silicon-hydrogen linkages and 10 parts of an organopolysiloxane containing silicon-bonded vinyl radicals. The SiH-containing polymer was a dimethyl hydrogen chain-stopped dimethylpolysiloxane containing an average of 100 dimethylsiloxane units per molecule and the vinyl-containing organopolysiloxane was a dimethylvinyl chain-stopped copolymer of dimethylsiloxane units and methylvinylsiloxane units containing an average of 100 dimethylsiloxane units per molecule and an average of one methylvinylsiloxane unit per molecule. To this mixture of fluids was added a sufficient amount of the catalyst solution of Example 1 to provide about 1500 moles of platinum per million moles of silicon-bonded vinyl groups in the reaction mixture. The reaction mixture was then maintained at a temperature of 100° C. to produce a cured silicone rubber having utility as a shock mounting device for apparatus requiring shock absorption at elevated temperatures.

Example 3

When the procedure of Example 1 was repeated, except that 0.85 gram of tetraisopropyl titanate was substituted for the tetrabutyl titanate of Example 1, platinum went into solution, but a homogeneous solution could not be formed.

Example 4

Amyltrichlorosilane is prepared by mixing equimolar amounts of trichlorosilane and pentene-1 with a sufficient amount of the catalyst solution of Example 1 to provide orthotitanate, and 1.20 grams of toluene. After agitating this reaction mixture for about 10 minutes, a homogeneous solution was prepared. When this catalyst solution was added to the methyl hydrogen polysiloxane 500 moles of platinum per million moles of the pentene-1. The reaction mixture is heated in a pressure vessel at a temperature of about 100° C. to effect the reaction.

Example 5

A reaction vessel was charged with 0.050 gram of chloroplatinic acid, 1.30 grams of tetrakis-(2-ethylhexyl) fluid-methylvinylpolysiloxane fluid mixture of Example 2 in an amount sufficient to provide 1000 moles of platinum per million moles of silicon-bonded vinyl groups, the resulting product cures to a silicone rubber in 10 minutes at 80° C.

Example 6

Three different catalyst solutions of this invention were prepared by adding to a reaction vessel 0.05 gram of chloroplatinic acid, 0.3 gram of tetrabutyl orthotitanate, and 2 grams of diphenyl ether dioxane, or di-n-amyl ether. After shaking each reaction mixture for approximately 10 minutes, homogeneous solutions had been formed. Following the procedure of Example 4, a sufficient amount of these cataylsts are added to a mixture of trichlorosilane and pentene-1 to provide 500 moles of platinum per million moles of pentene-1, and after maintaining the reaction mixture pressure vessels at 100° C. for 30 minutes, amyltrichlorosilane is formed.

While the foregoing examples have illustrated a number of embodiments of my invention, it should be understood that the invention is directed generally to catalyst solutions prepared by the addition of chloroplatinic acid to an alkyl orthotitanate described in an organic solvent, and to the use of this solution in catalyzing SiH-olefin addition reactions of various types to form compositions containing new silicon-carbon linkages. The SiH-olefin addition reaction may be employed in the manufacture of monomeric materials, such as amyltrichlorosilane, as illustrated above, and can also be employed in the manufacture of cured organopolysiloxane products. These products have recognized known utility in the art.

What I claim as new and desire to secure by Letters Patent of the United States is:

1. A catalyst solution consisting essentially of the homogeneous product obtained by mixing chloroplatinic acid with an alkyl orthotitanate having the formula:

$$(RO)_4Ti$$

in the presence of an organic solvent, inert to the reactants under the conditions of the reaction, where R is an alkyl radical having at least 4 carbon atoms.

2. The method of forming a catalyst solution which comprises mixing chloroplatinic acid with an alkyl orthotitanate having the formula:

$$(RO)_4Ti$$

where R is an alkyl radical having at least 4 carbon atoms in the presence of an organic solvent inert to the reactants under the conditions of the reaction and agitating the reaction until a homogeneous solution is formed, said alkyl orthotitanate being present in the ratio of at least 5 moles per mole of said chloroplatinic acid.

3. The process of claim 2, in which the alkyl orthotitanate is tetrabutyl titanate.

4. A process for the production of organosilicon compositions containing silicon-carbon bonds which comprises contacting a silicon compound containing at least one hydrogen atom attached to silicon per molecule, there being not more than two hydrogen atoms attached to any one silicon atom, with a compound containing aliphatic carbon atoms linked by multiple bonds in the presence of an amount of the catalyst solution of claim 1 sufficient to provide from 1 to 2,000 moles of platinum per 1,000,000 moles of aliphatically unsaturated groups in said compound containing aliphatic carbon atoms linked by multiple bonds.

No references cited.

TOBIAS E. LEVOW, *Primary Examiner.*

J. PODGORSKI, *Assistant Examiner.*